May 10, 1955  JEAN-BAPTISTE BOISVERT  2,707,884
COMPOSITE GEAR WHEEL
Filed July 2, 1952  3 Sheets-Sheet 1
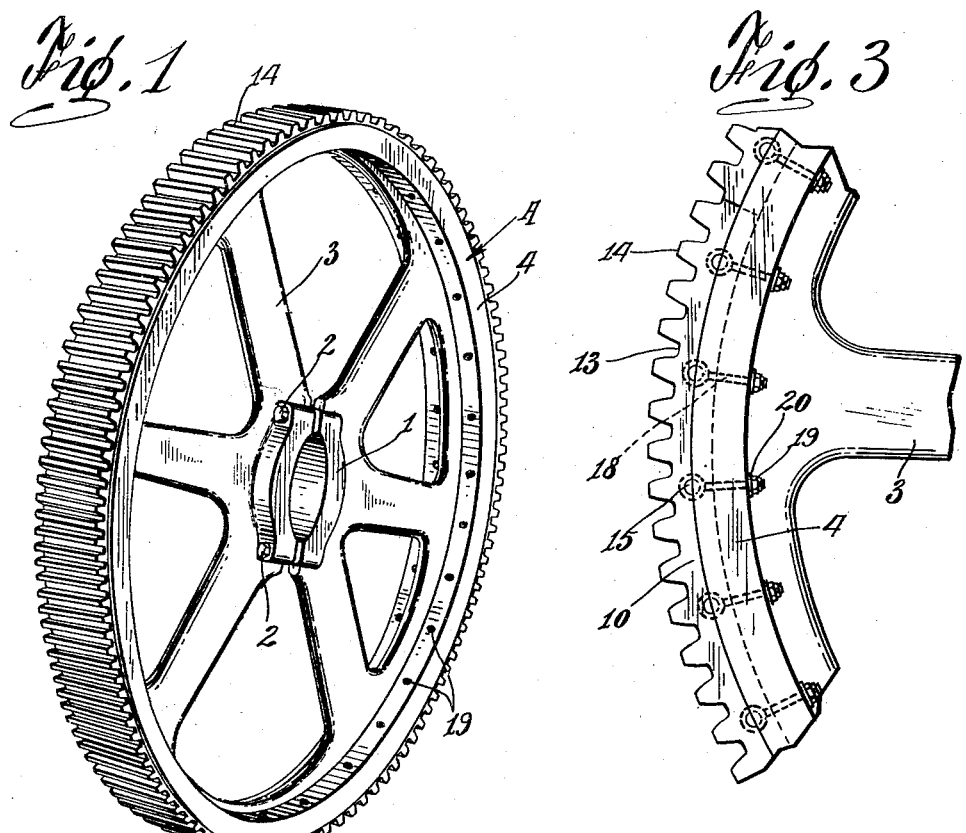
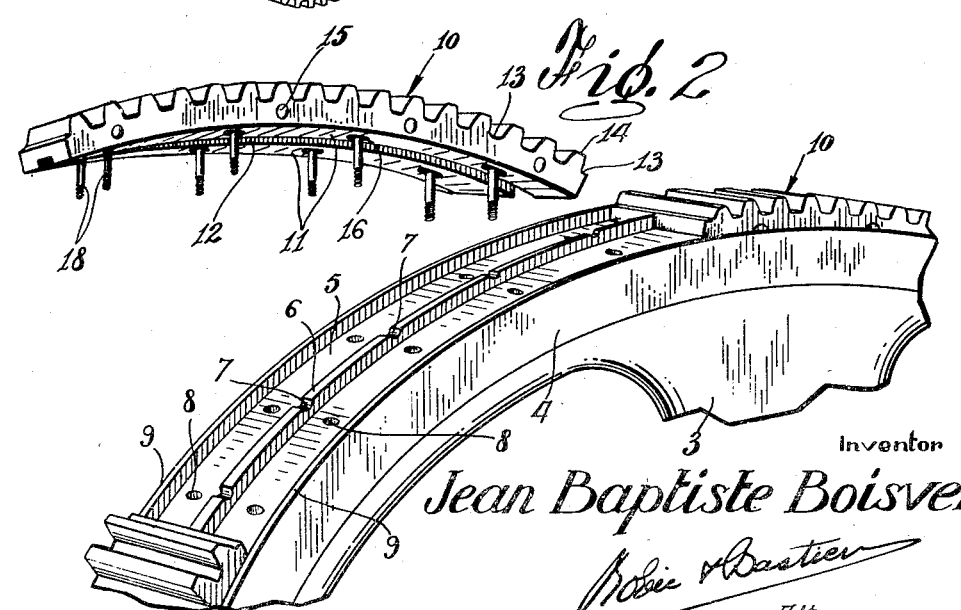
Inventor
Jean Baptiste Boisvert
Attorneys May 10, 1955   JEAN-BAPTISTE BOISVERT   2,707,884
COMPOSITE GEAR WHEEL Filed July 2, 1952   3 Sheets-Sheet 2

Inventor
Jean Baptiste Boisvert

Attorneys

May 10, 1955  JEAN-BAPTISTE BOISVERT  2,707,884
COMPOSITE GEAR WHEEL
Filed July 2, 1952
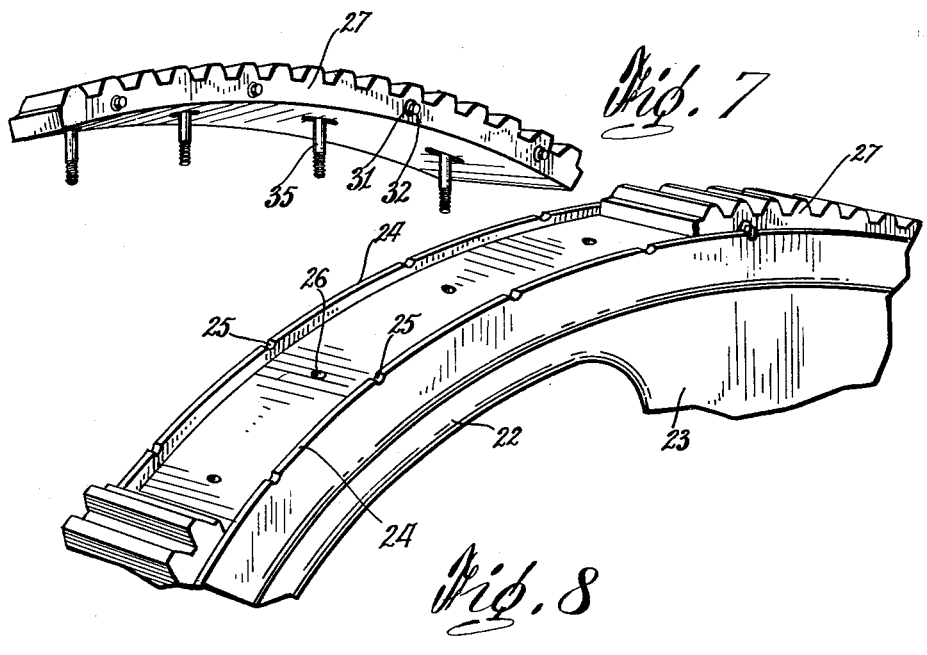
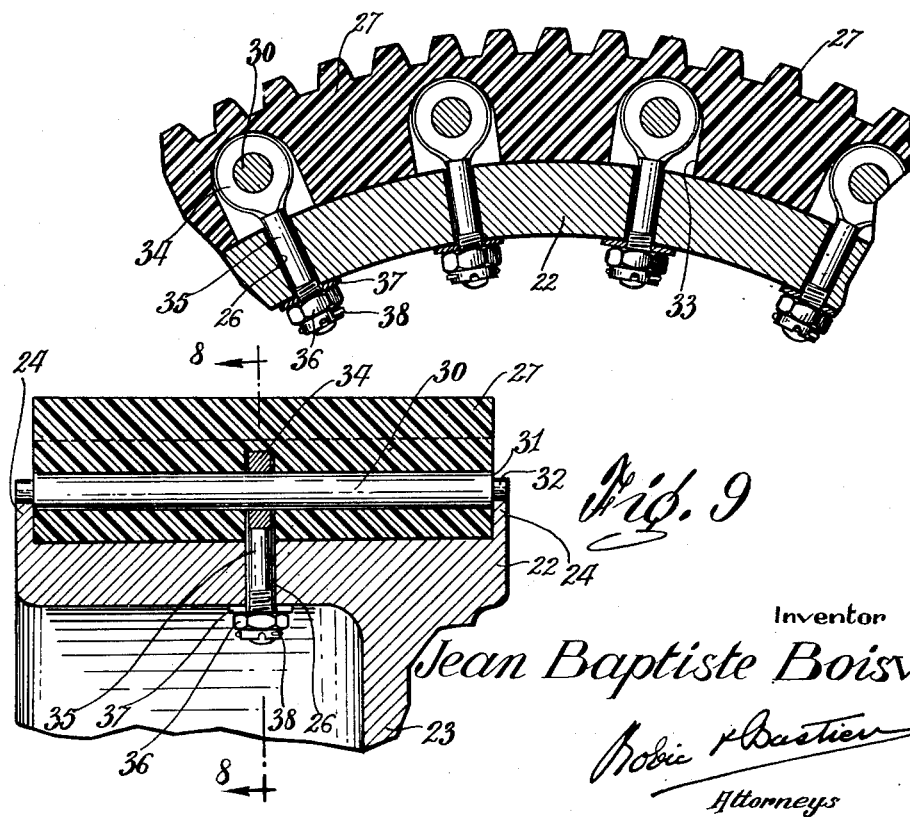
Inventor
Jean Baptiste Boisvert
Attorneys United States Patent Office 2,707,884
Patented May 10, 1955

2,707,884
COMPOSITE GEAR WHEEL

Jean-Baptiste Boisvert, Plessisville, Quebec, Canada, assignor to Forano Limitee, Plessisville, Quebec, Canada Application July 2, 1952, Serial No. 296,783

11 Claims. (Cl. 74—448)

The present invention relates to non-metallic gears and more particularly is an improvement in the manner used to fix, retain in place and lock non-metallic gear segments on a metal center, also to provide for easy replacement of these segments.

The necessity in modern industry to increase the volume of production and to lower the manufacturing cost by the use of high speed machinery, has brought about the development of non-metallic gears. Usually made from laminated fabric, bonded together with either phenol or urea-formaldehyde resin, these gears are remarkable for their high mechanical strength, their excellent resilient quality and their chemical resistance. When properly designed, fabricated and installed in a high speed gear train, they will eliminate, or greatly reduce friction wear, noise, shocks, vibrations and accidents. Consequently they will also reduce the rapid deterioration of the machine, the expensive delays caused by the interruption of the work and the cost of repairs which are the common results of running all metal gears at high rates of speed.

The usual practice followed when placing a non-metallic gear in a gear train composed of two gears only, is to make the smallest gear, called the pinion, with non-metallic material, leaving its mate or the large gear with metal teeth. This is for a standpoint of economy, because metal is usually cheaper than non-metallic material. But when the train is composed of three or more gear units, the usual practice is to alternate a non-metallic tooth gear with a metal tooth gear to have a non-metallic gear at every second one. It may now be understood why some medium and large gears must also be made of non-metallic material.

Let us consider for instance the dryer gears, as used in many paper mills, having a diameter of four to seven feet, a four to ten inch face, meshing in a group of twenty to sixty in a single paper machine, driven from motors totalling up to a thousand horsepower; half of these gears should be made with non-metallic teeth to resist the velocity of nearly two thousand feet per minute now required to satisfy the increased paper demand.

If large pinions can be easily produced from a single piece of non-metallic material or from a few disks riveted together between metal flanges, the construction of large gears having non-metallic teeth becomes more complicated, due to the fact that the non-metallic material is not available in a size large enough to produce them in one piece, or because it would cost too much to be easily marketable when constructed in non-metallic material only.

Therefore, these large dryer gears have to be made from laminated plastic segments, or similar non-metallic material, securely screwed, bolted or riveted over a metal center.

Experience has proven that high speed dryer gears must be of extreme accuracy to stand up under long periods of time when handling delicate material such as wet newsprint paper which can tear easily under light shocks or variable tensions.

The requirements to be met by such large dryer gears are not easily described in a few words, but let us say that they must be reliable under all sorts of adverse service conditions.

They should be correctly designed for their service with proper pitch, diameter and face; overloading is never economical. The tooth profile of all gears in the train should be alike and accurately hobbed, not cut with rotary range cutters, because a hobbed finish is superior to a finish resulting from a single cut operation which leaves radial marks across the teeth and is more subject to variable tooth spacing. The hub of these large gears should be split or clamped for easy installation or replacement. They should be perfectly concentric and the face of the gears must be correctly aligned. No gear, even though properly designed as to duty, can have satisfactory life if poorly fabricated or poorly installed in such a manner as to have the majority of the load distributed on a portion of the tooth face only.

If the known method of holding the non-metallic material between flanges is found satisfactory to a certain extent on pinions and gears running at moderate speed, it will not prove to be as efficient if applied to large diameter gears running at high sped, due to the fact that the gear segments being subjected to high centrifugal force tend to loosen and be separated from their metal center. In such cases, the non-metallic segments should be radially anchored through the rim of the metal center.

The present invention has been conceived to profit from the advantages described above in making gears having non-metallic segments which cannot slip or work loose in normal operation.

The principal object of the present invention is to provide an improved manner of firmly affixing laminated gear segments of non-metallic material over a metal center, with the use of metal inserts having large bearing and shearing surface areas, fastened with bolts passing radially through the rim of the metal center and leaving the gear sides free from any protrusion.

A further object of the invention is to retain in their affixed position and prevent any slippage of the non-metallic gear segments over a metal center, by the use of metal pins inserted in the non-metallic material, the said pins lying crosswise in notches cut at spaced intervals in a flange of the metal center.

A very important object of the invention is to provide a positive means for locking all parts used to retain the non-metallic gear segments on a metal center, by the use of pins located between metal flanges, the said pins held in place with bolts, washers, nuts and cotter pins, thus eliminating the possibility of any of the component parts working loose in operation.

Another important object of the invention is to provide easy replacement of a set of non-metallic gear segments on an existing center without the necessity of disturbing this center when already installed.

Referring now more particularly to the accompanying drawings wherein has been described two embodiments of the invention:

Figure 1 is a perspective view of the composite gear wheel according to the invention;

Figure 2 is a fractional perspective view of the rim and showing one gear segment removed;

Figure 3 is a fractional side elevation of the wheel;

Figure 7 is a fractional perspective view of another embodiment of the gear wheel, according to the invention, showing a gear segment removed;

Figure 8 is a longitudinal section along line 8—8 of Figure 9; and

Figure 9 is a fractional cross-section of the rim of the second embodiment.

Figure 4:
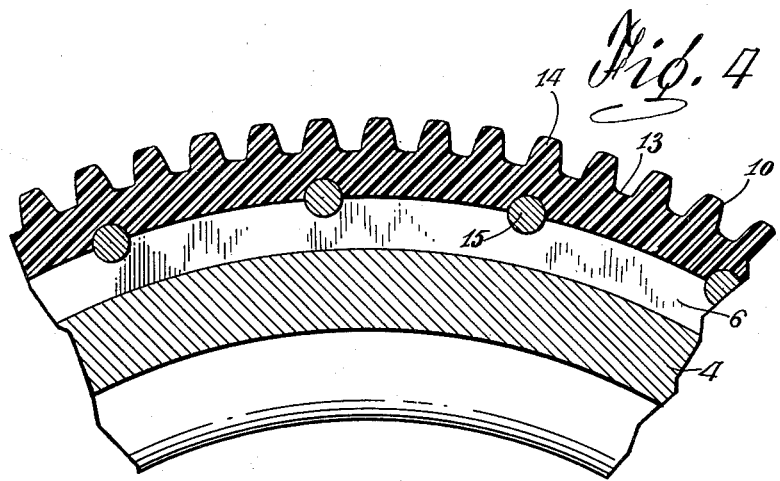
Figure 4 is a longitudinal fractional section of the wheel rim and a gear segment along line 4—4 of Figure 6.
Figure 5:
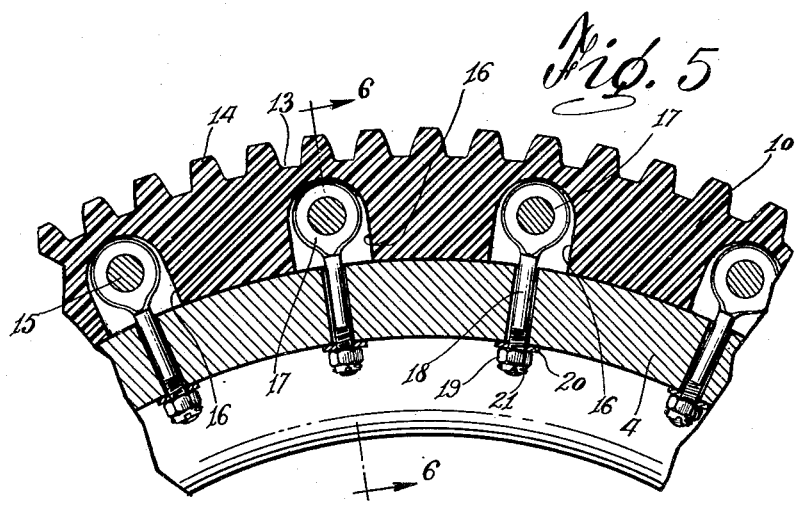
Figure 5 is a longitudinal section along line 5—5 of Figure 6.

Referring now more particularly to the drawings in which like reference characters indicate like elements throughout, the wheel center, indicated at A, is made of metal and is of the split hub type in which the hub sections 1 are tightened over the shaft by means of clamping bolts 2. The radially extending arms or spokes 3 support a wheel rim 4, the outer face 5 of which has a straight cross-section.

In the embodiment of Figures 1 to 6, the rim 4 extends equally on both sides of the spokes 3, said spokes 3 being joined to the rim 4 along the center line thereof. A longitudinally extending radially projecting center flange 6 depends from the outer face 5 of the rim 4 and is provided along its outer edge with a plurality of spaced semi-circular notches 7. With each notch 7 is associated a pair of bores 8 passing through the rim 4 and disposed on each side of said notch 7 in transverse alignment therewith.

The rim 4 is further provided with longitudinally extending radially projecting flanges 9 depending from both sides of said rim 4. A plurality of gear segments 10 made of non-metallic material, have an inner face 11 of straight cross-section adapted to contact the outer face 5 of the rim 4. A longitudinally extending groove 12 is made at the inner face 11 of said gear segments 10 in order to receive the center flange 6 of the rim 4. The gear segments 10 have such a width so as to fit snugly between the side flanges 9 of the rim 4 and each terminates in a recess 13 between the gear teeth 14.

Figure 6:
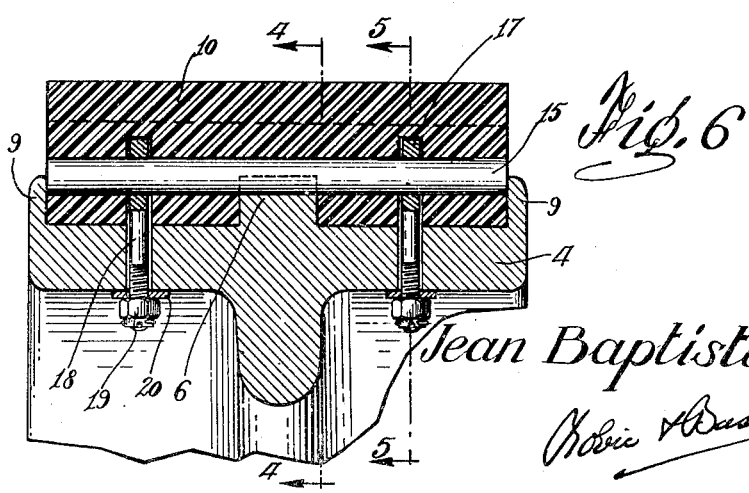
Figure 6 is a cross-section along line 6—6 of Figure 5.

Transversely extending inserts or pins 15 are embedded within the gear segments 10 at spaced intervals and project within the longitudinal groove 12 in order to engage the notches 7 of the center flange 6. The ends of the pins 15 are flush with the side faces of the gear segments 10 in order to abut the side flanges 9 as shown in Figure 6 when the gear segments are in position on the rim 4.

The pins 15 also pass through a pair of recesses 16 made on each side of the central groove 12 in the inner face 11 of the gear segments 10 for receiving the eye portion 17 of the eye bolts 18. Said eye portions 17 surround the pins 15 and the shank of the eye bolt extends through the bores 8 of the rim 4 to be secured to said rim at their lower threaded ends by means of castle nuts 19. A washer 20 is disposed between each nut 19 and the underface of the rim 4 and a cotter pin 21 goes through the shank of the bolt 18 and opposed notches made in the nut 19 in order to lock the same against rotation.

The second embodiment of the invention, illustrated in Figures 7, 8 and 9, is more particularly adapted for a wheel center of the type in which the rim 22 projects from one side only of the spokes 23.

In this embodiment there is no center flange and the side flanges 24, projecting radially outwardly from both sides of the rim 22, are provided with a plurality of spaced notches 25 made in the outer edge thereof and transversely aligned in pairs. A bore 26 is made through the rim 22 at the center thereof and on the line joining each pair of notches 25. The gear segments 27 are provided with pins 30 embedded therein and extending transversely of the same. These pins 30 form, at both ends, a shoulder 31 adapted to abut the inner face of the side flanges 24, and their outer ends 32, of smaller diameter, project from the sides of the gear segments 27 to engage the notches 25.

Each pin 30 passes through a recess 33 made in the gear segments 27 opposite each bore 26. The eye portion 34 of the eye bolt 35 is inserted within the recess 33 and encloses the pin 30; the shank portion of said bolt 35 passes through the bore 26 to be secured to the rim 22 by the castle nut 36. A washer 37 and a cotter pin 38 are also provided.

From the foregoing description it will be apparent that slipping of the gear segments relatively to the rim of the wheel center is absolutely impossible. Said gear segments are securely held against the centrifugal force exerted thereon and which may be considerable, especially in high speed rotating gear wheels of large diameters. It will also be noted that the structure according to the invention permits the increase of the number of eye bolts in the transverse rows of said bolts according to the width of the gear segments such that said segments will be securely held over their entire section. For instance five eye bolts per row would preferably be used for gear segments of 30 inches in width.

When a train of gear wheels, according to the invention, is used in paper making machines, it is believed that the present linear speed of said machines will be increased by about 25%.

While preferred embodiments according to the invention have been illustrated and described, it is understood that various modifications may be resorted to without departing from the spirit and scope of the appended claims.

What I claim is:

1. A composite gear wheel comprising a wheel center having a rim and a radially projecting flange on said rim, said flange having notches made at spaced intervals in the outer edge thereof, a plurality of detachable gear segments, pins extending across said segments and embedded therein, said pins engageable in said notches, and fasteners connecting said pins to said rim, radially extending through said rim and attached to said pins at points intermediate the sides of said segments.

2. A composite gear wheel comprising a wheel center having a rim and a radially projecting flange on said rim, said flange having notches made at spaced intervals in the outer edge thereof, a plurality of detachable gear segments having a longitudinal groove at their inner face for receiving said flange, inserts extending across and embedded in said segments and engageable in said notches, and fasteners securing said inserts to said rim, radially extending through said rim and surrounding said inserts at points intermediate the sides of said gear segments.

3. A composite gear wheel comprising a wheel center having a rim and a radially projecting flange on said rim, said flange having notches made at spaced intervals in the outer edge thereof, a plurality of detachable gear segments having a longitudinal groove at their inner face for receiving said flange, pins extending across said segments, embedded therein and projecting within said groove, said pins engageable with said notches, and eye bolts surrounding said pins and secured to said rim.

4. A composite gear wheel comprising a metal wheel center having a rim and a radially projecting flange on said rim, said flange having notches made at spaced intervals in the outer edge thereof, a plurality of detachable non-metallic gear segments having a longitudinal groove at their inner face for receiving said flange, pins extending across said segments and embedded therein, each pin being disposed opposite a gear tooth, said pins engageable in said notches, and eye bolts surrounding said pins and fastened to said rim at their other end.

5. A composite gear wheel comprising a metal wheel center having a rim and radial flanges projecting from both sides of said rim, a center radially projecting flange depending from said rim and having notches made at spaced intervals in the outer edge thereof, a plurality of detachable non-metallic gear segments having a longitudinal groove for receiving said center flange, said side radial flanges abutting the sides of said segments, a plurality of pins extending across said segments and embedded therein, said pins engageable in said notches with their ends abutting said side flanges, and fastening means connecting said pins to said rim.

6. A composite gear wheel comprising a metal wheel center having a rim with an outer face of straight cross-section, a longitudinally extending radially projecting flange depending from the middle of said rim, said flange having notches made at spaced intervals in the outer edge thereof, a pair of longitudinally extending radially projecting flanges depending from both sides of said rim, a plurality of detachable non-metallic gear segments having their inner face adapted to contact the outer face of said rim between said side flanges and having a longitudinally extending groove for receiving said notched flange, pins extending across said segments, embedded therein and projecting within said groove, said pins engageable within said notches and abutting said side flanges at their ends, and eye bolts surrounding said pins on each side of said notched flange and passing through said rim, and lock nuts engaging the inner threaded end of said eye bolts on the inner face of said rim.

7. A composite gear wheel as claimed in claim 6 wherein said pins are each disposed opposite a gear tooth.

8. A composite gear wheel as claimed in claim 6 wherein said gear segments terminate within a recess between two gear teeth.

9. A composite gear wheel comprising a wheel center having a rim and two longitudinally extending radially projecting flanges depending from both sides of said rim, said flanges having aligned notches made at spaced intervals in the outer edge thereof, a plurality of detachable gear segments having an inner face adapted to contact the outer face of said rim between said side flanges, pins extending across said segments and embedded therein, a shoulder formed at both ends of said pins for abutting said side flanges, the ends of said pins projecting from said segments and engaging said notches, said gear segments having recesses made at the inner face thereof and through which said pins pass, and eyebolts engaging said recesses surrounding said pins and secured to said rim at their other ends.

10. A composite gear wheel as claimed in claim 9 wherein said pins are each disposed opposite a gear tooth and said gear segments terminate within a recess between two gear teeth.

11. A composite gear wheel comprising a metal wheel center having a rim provided with spaced radial bores disposed in transverse rows and opening at the outer face and inner face of said rim, non-metallic detachable gear segments having an inner face for contacting the outer face of said rim and having recesses in the inner face of said segments and disposed in transverse rows, pins extending across said gear segments, embedded therein and passing through said recesses, and fasteners surrounding said pins within said recesses, passing through said radial bores and secured to said rim at the inner face thereof.

References Cited in the file of this patent
FOREIGN PATENTS 127,769    Great Britain _____ June 12, 1919